United States Patent
Jons et al.

(10) Patent No.: US 8,834,663 B2
(45) Date of Patent: Sep. 16, 2014

(54) ELECTRODEIONIZATION DEVICE INCLUDING ION EXCHANGE SPACER AND METHOD OF ASSEMBLY

(75) Inventors: Steven D. Jons, Eden Prairie, MN (US); Joseph Dooley, Midland, MI (US); David J. Moll, Midland, MI (US); Gregg L. Poppe, Prior Lake, MN (US); Mark A. Spalding, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/115,638

(22) PCT Filed: May 22, 2012

(86) PCT No.: PCT/US2012/038913
§ 371 (c)(1), (2), (4) Date: Nov. 5, 2013

(87) PCT Pub. No.: WO2012/170192
PCT Pub. Date: Dec. 13, 2012

(65) Prior Publication Data
US 2014/0083601 A1 Mar. 27, 2014

Related U.S. Application Data

(60) Provisional application No. 61/495,596, filed on Jun. 10, 2011.

(51) Int. Cl.
*B01D 61/00* (2006.01)
*B29C 47/00* (2006.01)
*B65H 81/00* (2006.01)
*C02F 1/469* (2006.01)
*B01D 61/48* (2006.01)

(52) U.S. Cl.
CPC .......... *B01D 61/485* (2013.01); *C02F 1/4695* (2013.01); *C02F 2201/003* (2013.01); *B01D 61/48* (2013.01)
USPC . 156/244.11; 156/155; 156/187; 156/244.24; 156/703; 156/704; 204/524; 204/533; 204/536

(58) Field of Classification Search
CPC .... B01D 61/48; B01D 61/485; C02F 1/4695; B01J 47/08
USPC .................... 156/244.11, 187, 703–704, 155, 156/244.24; 204/523, 524, 533, 536, 204/632–634; 264/344, 109
See application file for complete search history.

(56) References Cited

U.S. PATENT DOCUMENTS 3,055,729 A 9/1962 Rhchter, Jr. et al.
3,271,292 A 9/1966 Kollsman
(Continued)

FOREIGN PATENT DOCUMENTS

JP 11319498 11/1999
JP 2010234288 A 10/2010
(Continued)

*Primary Examiner* — John Goff
*Assistant Examiner* — Carson Gross
(74) *Attorney, Agent, or Firm* — Edward W. Black

(57) ABSTRACT

A method for assembling an electrodeionization device comprising providing in a sequential arrangement: an anode, membrane cell assembly, cathode; wherein the membrane cell assembly comprises at least one sequential arrangement of: a cation exchange membrane, concentrating chamber, anion exchange membrane, diluting chamber, cation exchange membrane, concentrating chamber and anion exchange membrane. The method includes locating an ion exchange spacer in at least one chamber of the membrane cell assembly wherein an ion exchange spacer comprises an ion exchange resin and a dissolvable binder.

5 Claims, 4 Drawing Sheets

(56) References Cited

U.S. PATENT DOCUMENTS

| | | |
|---|---|---|
| 4,339,548 A | 7/1982 | Miyahara |
| 4,585,583 A | 4/1986 | Roberson et al. |
| 5,066,375 A | 11/1991 | Parsi et al. |
| 5,120,416 A | 6/1992 | Parsi et al. |
| 5,203,976 A | 4/1993 | Parsi et al. |
| 5,244,929 A | 9/1993 | Gottlieb et al. |
| 5,376,253 A | 12/1994 | Rychen et al. |
| 5,622,997 A | 4/1997 | Tennison et al. |
| RE35,741 E | 3/1998 | Oren et al. |
| 6,149,788 A | 11/2000 | Tessier et al. |
| 6,241,866 B1 | 6/2001 | Mir |
| 6,607,647 B2 | 8/2003 | Wilkins et al. |
| 6,625,863 B2 | 9/2003 | Proulx et al. |
| 6,881,336 B2 | 4/2005 | Johnson |
| 7,029,563 B2 | 4/2006 | Li et al. |
| 7,094,325 B2 | 8/2006 | Mack et al. |
| 7,097,752 B2 | 8/2006 | Li et al. |
| 7,097,753 B2 | 8/2006 | Li et al. |
| 7,163,964 B2 | 1/2007 | Chidambaran et al. |
| 7,261,802 B2 | 8/2007 | Xu et al. |
| RE40,733 E | 6/2009 | Li et al. |
| 7,591,933 B2 | 9/2009 | Grebenyuk et al. |
| 2004/0057933 A1 | 3/2004 | Wilson et al. |
| 2004/0073535 A1 | 4/2004 | Iwasaki |
| 2007/0051684 A1 | 3/2007 | Grebenyuk et al. |
| 2007/0163891 A1 | 7/2007 | Menzel et al. |
| 2008/0105552 A1 | 5/2008 | Li et al. |

FOREIGN PATENT DOCUMENTS

| | | | |
|---|---|---|---|
| JP | 2011056376 | | 3/2011 |
| JP | 2011056376 A | * | 3/2011 |
| WO | 2001037995 | | 3/2004 |
| WO | 2004024992 | | 3/2004 |
| WO | 2008131085 | | 10/2008 |

* cited by examiner

"ELECTRODEIONIZATION DEVICE INCLUDING ION EXCHANGE SPACER AND METHOD OF ASSEMBLY

FIELD OF THE INVENTION

The present invention relates to electrodeionization devices, component parts and methods for assembling the same.

DESCRIPTION OF THE RELATED ART

Electrodeionization (EDI) is a well known process for removing ionizable species from liquids using electrical potential to drive ion transport through ion-selective membranes. FIG. 1 illustrates an idealized view of a typical plate and frame configured EDI device at 10 including alternating semi-permeable positively charged anion exchange membranes "AEM" (12) and negatively charged cation exchange membranes "CEM" (14) located between an opposing anode (16) and cathode (18) and separated by chambers defining flow pathways between the membranes. Porous spacers are often positioned within the chambers to maintain spacing and facilitate liquid flow therethrough. In operation, a transverse DC electrical field is applied across the device as liquid feed flows (indicated by upward arrows) through the chambers such that ions in the feed liquid are drawn toward their respective counter electrodes. Specifically, liquid flowing through "diluting" chambers (20, 20', 20") bounded by an AEM (12) facing the positively charged anode (16) and a CEM (14) facing the negatively charged cathode (18) become depleted of ions. Liquid flowing through "concentrating" chambers (22, 22', 22", 22''') bounded by an AEM (12) facing the cathode and a CEM (14) facing the anode (16) effectively trap ions drawn from adjacent diluting chambers. Liquid exiting the device (10) from the concentrating chambers is referred to as "concentrate" or "reject" and has a relatively higher concentration of ionic species while liquid exiting the diluting chambers is referred to as "dilute" or "permeate" and has a relatively lower concentration of ionic species. One or more chambers may be filled with ion exchange media (24) to facilitate ion transport. Examples of applicable ion exchange media include porous or gellular ion exchange resins in the form of particles, e.g. granular, fiber or bead form. The chambers may contain a single type of ion exchange resin or mixtures including both cation (26) and anion (28) exchange resins provided in various arrangements, e.g. random or banded as described in U.S. 2007/0051684.

Various techniques have been used to fill the chambers of an EDI device with ion exchange resins. For example, U.S. Pat. Nos. 5,066,375, 5,120,416, 5,203,976, 7,094,325 and USP 2004/073535 describe the introduction of slurries of ion exchange resin into pre-formed chambers. In an alternative approach, ion exchange resin may be adhered to a spacer sheet or held within a spacer-like spacer envelope that is positioned between membranes as the chambers are formed. Spacers typically comprise a non-woven or woven mesh, web or screen material as described in U.S. Pat. Nos. 7,591,933 and 6,881,336. U.S. Pat. No. 3,271,292 describes a similar approach using a spacer sheet including ion exchange fibers bound within a resin matrix. In yet another embodiment, a spacer-like spacer support frame supports ion exchange resin within the dilution chamber as described in U.S. Pat. No. 7,097,753.

These known techniques for incorporating ion exchange resin into an EDI device have several drawbacks. Techniques involving the introduction of slurry mixtures are time consuming and require the use of specialized equipment. Moreover, ion exchange packing density tends to vary between different chambers. Additionally, it is difficult to achieve multi-layered or banded arrangements of different ion exchange resin. And while the use of pre-formed spacers or envelops incorporating ion exchange resin address many of these shortcomings, such techniques require the introduction of an additional spacer material that adds bulk and limits ionic transport by serving as a partial insulator.

BRIEF SUMMARY OF THE INVENTION

The present invention includes an electrodeionization device, an ion exchange spacer and method for assembling the same including the step of providing an anode, membrane cell assembly and cathode in sequential arrangement wherein the membrane cell assembly comprises at least one sequential arrangement of: a cation exchange membrane, concentrating chamber, anion exchange membrane, diluting chamber, cation exchange membrane, concentrating chamber and anion exchange membrane. The invention includes the step of providing an ion exchange spacer comprising ion exchange resin and a dissolvable binder within at least one chamber of the membrane cell assembly. Many different embodiments are described.

BRIEF DESCRIPTION OF THE DRAWINGS

The invention and various embodiments may be better understood by reference to the detailed description and accompanying figures. The figures are provided to facilitate description and are not necessarily to scale. Within these sections, like reference numerals refer to like elements.

DETAILED DESCRIPTION OF THE INVENTION

Figure 1:
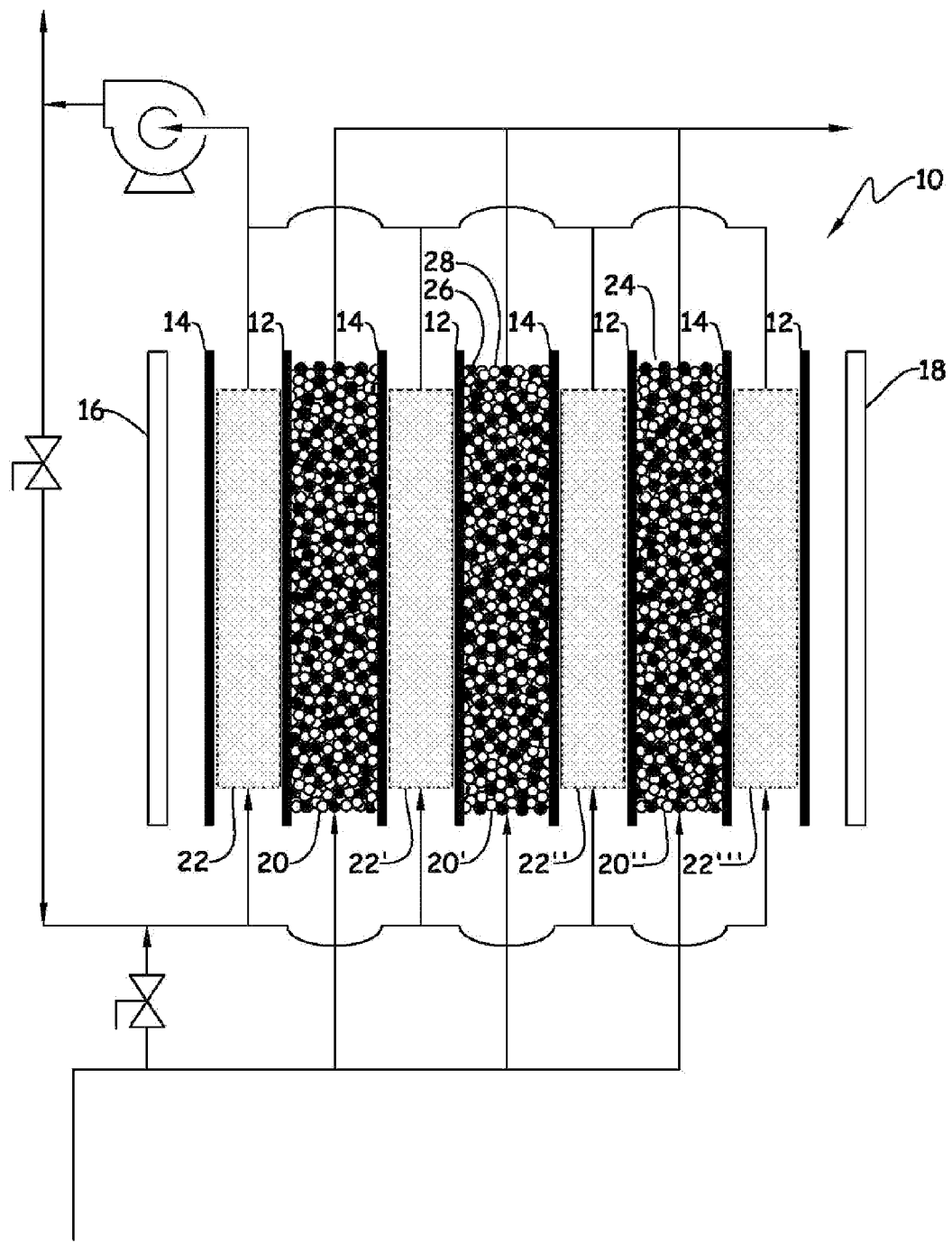
FIG. 1 is an idealized elevational view of a plate and frame configured EDI device.

The present invention includes an ion exchange spacer and a method for making the same. The ion exchange spacer comprises ion exchange resin and a dissolvable binder. The selection of ion exchange resin is not particularly limited. Representative examples include both macroporous and gellular ion exchange resins in the form of particles, e.g. granular, fiber and bead (e.g. including uniform particle size ion exchange resins). Applicable resins include those derived from styrene and divinylbenzene or acrylates that are subsequently functionalized (e.g. via amination or sulfonation). Specific examples include Dowex™ 1 brand anion exchange resin and Dowex™ Marathon™ C brand cation exchange resin, both available from The Dow Chemical Company.

While the selection of dissolvable binder is not particularly limited, the binder must be capable of being formed into a structure, such as by way of casting, extrusion, coating or melt processing. In some embodiments, the binder may include a solvent or plastizer which evaporates or is otherwise removed after shaping of the binder. Other optional additives such as thickening agents and humectants may also be included. In other embodiments, no additives or solvents are included. The binder must also be dissolvable. As used herein, the term "dissolvable" means that the binder no longer maintains a pre-formed structure when exposed to a solvent, e.g. the binder substantially dissolves when immersed in the solvent (e.g. aqueous solutions such as water, acids, bases, organic solvents, etc.) such that the spacer structure deteriorates leaving behind unbounded ion exchange resin particles. For example, in one embodiment, a cubic cm sample of binder material substantially dissolves in less than 12 hours, preferably less than 6 hours and more preferably less than 1 hour when submerged with a stirred or agitated solution. In some embodiments, the use of a heated (e.g. 40-100° C.) solution may facilitate dissolution. In other embodiments, the use of a basic (e.g. pH 7.5-12, preferably >9) or acidic (e.g. pH 3-6.5, preferably <5) aqueous solution may facilitate dissolution. Preferred solvents include aqueous solutions. Representative binders include dissolvable solid foams and dissolvable gels including both inorganic materials such as calcium carbonate or aluminum hydroxide (e.g. as described in U.S. Pat. No. 4,389,238), and organic materials such as crosslinked polyvinyl alcohol (e.g. formed by combining polyvinyl alcohol with boric acid). Hydrogels are particularly preferred. Additional examples of dissolvable binders include water soluble materials including natural, modified natural and synthetic polymers such as: cellulose (e.g. methyl cellulose, carboxymethyl cellulose, hydroxyethyl cellulose, hydroxypropyl cellulose), starch, gelatin, collagen (e.g. animal glue), polysaccharide (e.g. gums), polyalkylene oxide (e.g. polyethylene glycol), water soluble ionomers, polyacrylamide, polyvinylpyrrolidone, polyvinyl alcohol and derivatives thereof.

The method for preparing the ion exchange spacer is not particularly limited. For example, ion exchange resin particles may be combined with a dissolvable binder, e.g. mixed, melt processed or otherwise blended, and then cast, extruded, pressed, sprayed or otherwise formed into a sheet or similar form. In an alternative embodiment, ion exchange particles may be applied to a pre-formed sheet made of a dissolvable binder. The ion exchange particles may be adhered to the binder by way of a dissolvable adhesive, by the inherent tackiness of the binder itself or by subjecting the binder to heat in order to soften the binder. In yet another embodiment, a mixture of ion exchange particles and dissolvable binder is co-extruded, spread or cast upon a release sheet which is subsequently removed from the ion exchange spacer once the ion exchange spacer is formed. In still another embodiment, ion exchange particles and a dissolvable binder are co-extruded, spread or cast upon a membrane sheet of a membrane cell assembly, as described below with reference to FIG. 4.

By way of specific example, a casting mixture of ion exchange resin particles and dissolvable binder are mixed to form a uniform paste which is dispensed within a mold or upon a flat surface. Pressure may be applied across the surface of the casting mixture to form a thin spacer. The casting mixture is preferably then dried (e.g. by way of heating at a temperature of about 60° C. for 30-60 minutes) to form a durable ion exchange spacer sheet which is capable of being handled during assembly of an EDI device. In one preferred embodiment, the casting mixture comprises at least 30 weight percent and more preferably from about 40 to 80 weight percent of ion exchange resin (based upon dry weight of ion exchange); and less than 50 weight percent and more preferably from about 5 to 30 weight percent of dissolvable binder with the remainder of the casting mixture comprising water and a humectants such as glycerol. It is preferable to use a relatively high concentration of ion exchange resin particles to enhance continuous contact between multiple resin particles, thereby approaching or exceeding the percolation limit. Banded or other ion exchange arrangements may be formed by segmenting the mold with removable spacing elements to define separate compartments. Each compartment may then be filled with the desired casting mixture. Thereafter, the spacing elements are removed and the casting mixture is dried to form an ion exchange spacer sheet.

In preferred embodiments the ion exchange spacer is flexible and can be manipulated during fabrication of a membrane cell assembly and EDI device. The ion exchange spacer is also preferably strong enough to maintain its physical integrity during storage and during assembly within an EDI device.

Figure 2A:
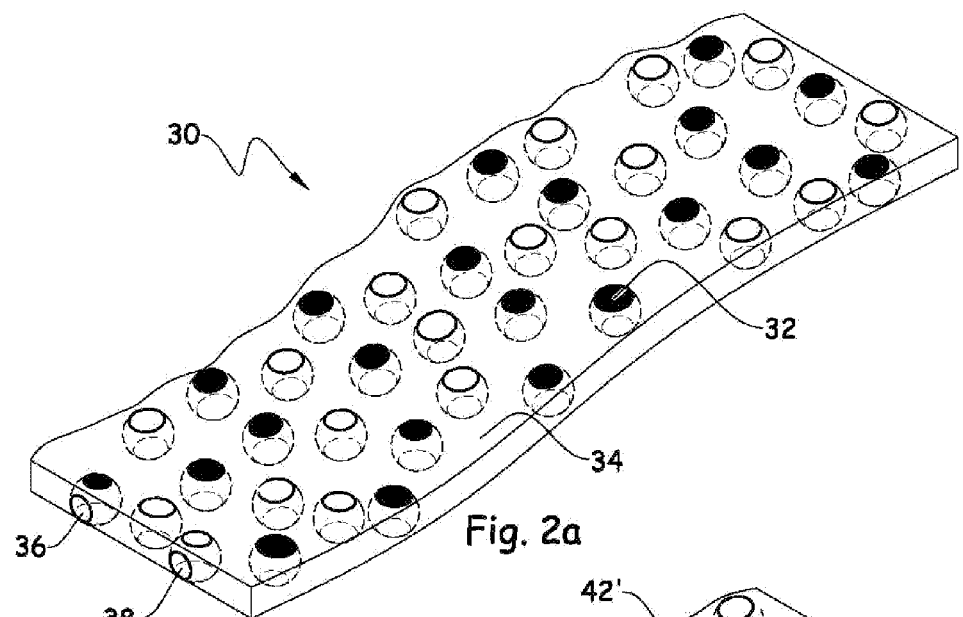
FIG. 2(a) is a perspective view of an embodiment of an idealized ion exchange spacer comprising ion exchange resin arranged in a random pattern within a dissolvable binder.
Figure 2B:
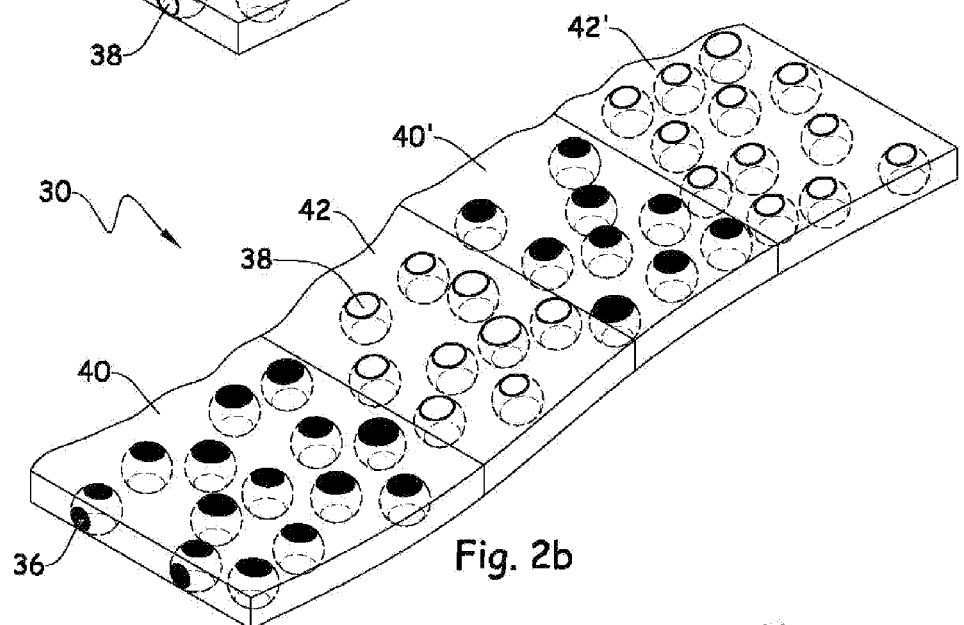
FIG. 2(b) is a perspective view of another embodiment of an ion exchange spacer comprising ion exchange resin arranged in a banded pattern within a dissolvable binder.
Figure 2C:
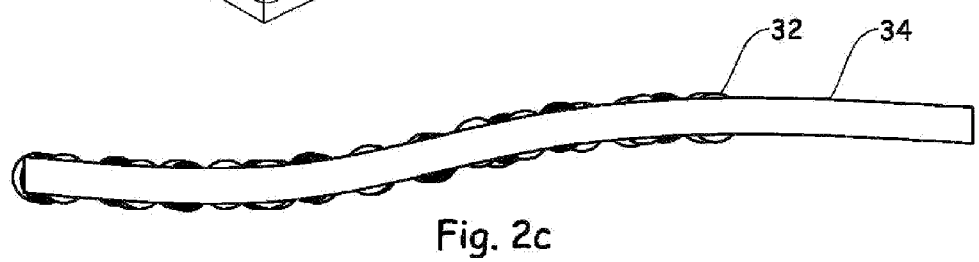
FIG. 2(c) is an elevational view of the ion exchange spacer illustrated in FIG. 2(a).

Several representative embodiments of the subject ion exchange spacer are shown in FIGS. 2(a-c). The spacer (30) comprises ion exchange resin particles (32) at least partially embedded or fixed within a dissolvable binder (34). The ion exchange resin particles (32) may be in various forms, e.g. fibers, granular, etc. but are preferably in bead form. The spacer (30) may comprise a single type of ion exchange resin, e.g. cation or anion, multiple types of cation or anion resin, or combinations. For example, the embodiment shown in FIG. 2(a) comprises a random mixture of cation (36) and anion (38) exchange resin particles while the embodiment shown in FIG. 2(b) comprises a banded or striped arrangement of cation (36) and anion (38) exchange resin particles. While not shown, the ion exchange spacer (30) may optionally include additional structure such as a backing fabric. For sake of simplicity, the thickness of the spacer (30) has been illustrated to be approximately equal to the diameter of an ion exchange particle (32). It will be appreciated that the thickness of the spacer is not particularly limited and may be thick enough to accommodate multiple ion exchange particles essentially stacked across the thickness of the spacer. Also, the thickness of the spacer may vary if other forms of ion exchange resin are utilized, e.g. fiber or granular. In several embodiments, the spacer (30) is flexible (e.g. can be wound about a 5 cm diameter central tube without breaking) and can be used in spiral wound configurations as described with reference to FIG. 3. In such embodiments, the ion exchange spacer may be wound about a central tube without breaking.

In the embodiment illustrated in FIG. 2(b), the ion exchange spacer (30) includes a banded arrangement wherein the majority by weight of ion exchange resin particles in a first band (40) are cation exchange resin particles (36) and the majority by weight of particles in a second band (42) are anion exchange resin particles (38). The pattern of alternating bands is repeated across the majority of the spacer (40', 42'). While not shown, alternative arrangements of different ion exchange resins may also be provided.

The present invention further includes a method of assembling an EDI device by providing in a sequential arrangement:

anode (+)/membrane cell assembly/cathode (−)

wherein the membrane cell assembly comprises at least one sequential arrangement of:

CEM/conc. chamber/AEM/diluting chamber/CEM/ conc. chamber/AEM wherein ion exchange resin particles are located in at least one chamber of the membrane cell assembly. This arrangement is illustrated in FIG. 1. In a preferred embodiment, ion exchange resin particles are located in a plurality of chambers of the membrane cell assembly, e.g. each diluting chamber (20, 20' and 20'''). As previously described with reference to FIGS. 2(a) and (b), the ion exchange resin particles are preferably provided in the form of an ion exchange spacer (30).

In one embodiment, the subject ion exchange spacer (30) is positioned between an AEM (12) and CEM (14) to define a diluting chamber (20) during the fabrication of a membrane cell assembly. Alternatively, or in addition to, an ion exchange spacer (30) may also be positioned between a CEM (14) and AEM (12) to define a concentrating chamber (22, 22', 22'', 22''') during the assembly of a membrane assembly. Once assembled, the dissolvable binder (34) of the ion exchange spacer (30) may be removed by flowing an aqueous rinse solution (e.g. water) through the chambers of the EDI device. The rinse solution may be heated to facilitate removal of the dissolvable binder. During or after this process, the unbounded ion exchange particles may expand and contact each other while remaining generally in their original arrangement.

Figure 3:
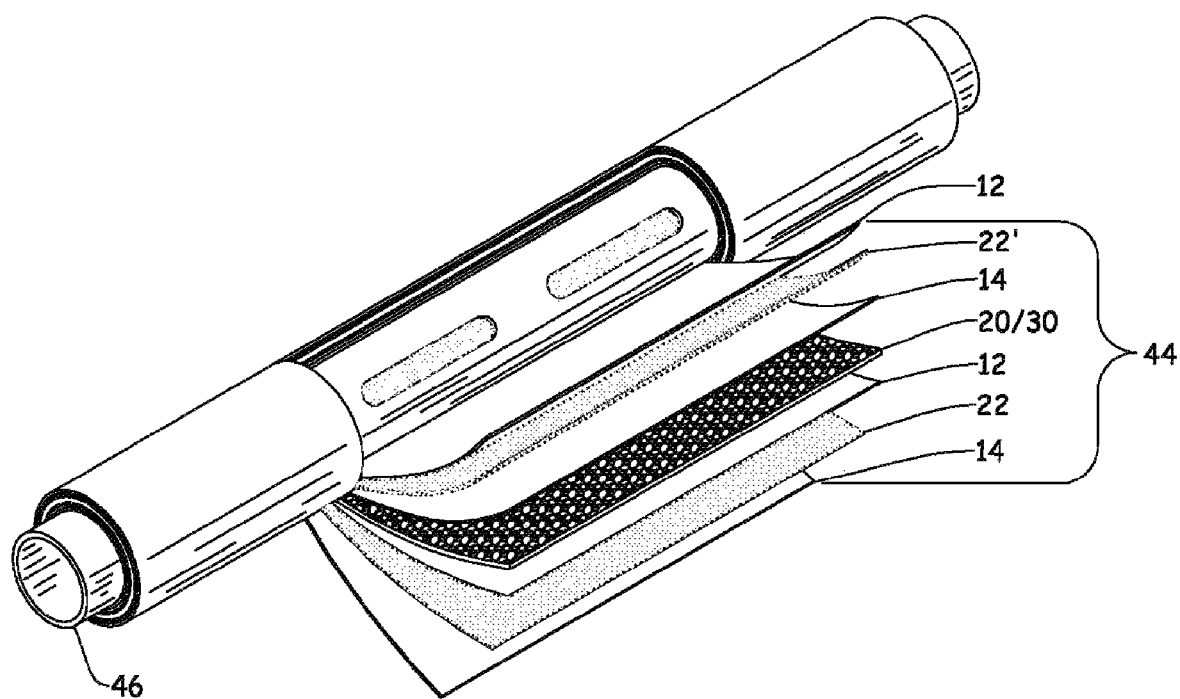
FIG. 3 is a partially cut-away perspective view of a spiral wound configured EDI device.

FIG. 3 illustrates a spiral wound configured EDI device similar to that described in US 2004/0173535. To facilitate description, FIG. 3 is partially cut away to illustrate a membrane cell assembly (44) comprising a CEM (14), concentrating chamber (22), AEM (12), diluting chamber (20), CEM (14), concentrating chamber (22') and AEM (12). In the illustrated embodiment, the concentrating chambers (22, 22') each comprise a spacer sheet comprising a non-woven web and the diluting chamber (20) comprises an ion exchange spacer (30) as described with reference to FIG. 2. The EDI device is assembled by arranging the aforementioned components (i.e. membranes, spacer sheets and ion exchange spacer) to form the membrane cell assembly (44) which is wound about a central tube or pipe (46). As is common with spiral wound configurations, the tube (46) may also serve as an electrode (e.g. cathode). The assembly may then be inserted within a cylindrical housing (not shown) including an anode (not shown) as per standard practice in the art.

Figure 4:
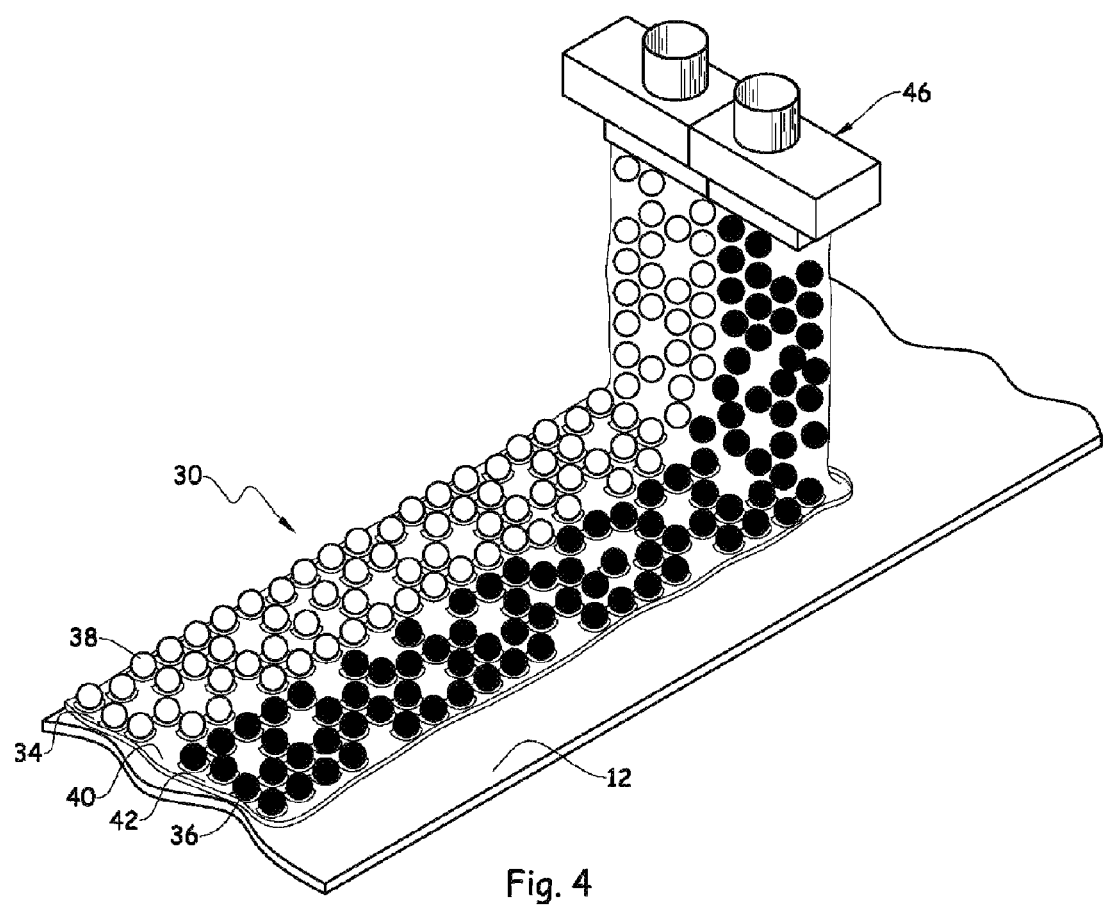
FIG. 4 is a perspective view of an idealized embodiment of a partially fabricated ion exchange spacer.

An alternative embodiment of an ion exchange spacer (30) is shown in FIG. 4. The spacer (30) is shown in a state of partial fabrication including alternating bands (40, 42) of ion exchange particles (36, 38) and dissolvable binder (34) being coated upon a surface of semi-permeable exchange membrane (12) from an extruder (46). In a similar manner as described with reference to FIG. 2(b), the arrangement may include alternating bands of cation (36) and anion (38) exchange resin particles. Once completely extruded, the individual bands are allowed to coalesce (e.g. heated, pressed, etc.) to form an ion exchange spacer (30) upon the surface of the membrane (12). The resulting composite structure can then be used within a membrane cell assembly wherein the ion exchange spacer (30) is arranged within at least one chamber. While not shown, the alternating bands alternatively comprise solid foams or gels including ion exchange resin particles and a dissolvable binder. Alternatively, the dissolvable binder may be a high viscosity liquid such that its flowing is inhibited during or following rolling an element. In one preferred embodiment, the preferred liquid may have a viscosity of at least 0.1 Pa sec at 20° C., more preferably at least 1 Pa sec, or even at least 10 Pa sec. These viscosities may be achieved with a non-polymeric additive, and the liquid may be a pure substance (e.g. glycerin) or a solution (e.g. concentrated sugar), as long as it is easy to dissolve in water and remove from the element.

Many embodiments of the invention have been described and in some instances certain embodiments, selections, ranges, constituents, or other features have been characterized as being "preferred." The designation of a feature as being preferred should not be interpreted as deeming such feature as an essential or critical aspect of the invention. EDI devices are available in two basic configurations: plate and frame as illustrated in FIG. 1 and as described RE 35741 and U.S. Pat. No. 6,149,788, and spiral wound such as illustrated in FIG. 3 and as described in U.S. Pat. No. 5,376,253, U.S. 2007/0163891, U.S. Pat. No. 7,591,933, RE 40733 and U.S. 2008/0105552. While the invention is applicable to both EDI configurations, it is particularly preferred in connection with spiral wound configurations as described with reference to FIG. 3.

The entire content of each patent reference cited herein is incorporated by reference.

The invention claimed is:

1. A method for assembling an electrodeionization device having a spiral wound configuration comprising providing in a sequential arrangement: an anode, membrane cell assembly, cathode; wherein the membrane cell assembly is wound about a central tube and comprises at least one sequential arrangement of: a cation exchange membrane, concentrating chamber, anion exchange membrane, diluting chamber, cation exchange membrane, concentrating chamber and anion exchange membrane, wherein ion exchange resin is located in at least one chamber of the membrane cell assembly; and wherein the method is characterized by providing the ion exchange resin as an ion exchange spacer prepared by extruding a mixture of cation exchange resin particles and dissolvable binder to form a first band and extruding a mixture of anion exchange resin particles and dissolvable binder to form a second band adjacent to the first band, and wherein the bands are coalesced to form the ion exchange spacer and subsequently dissolving the binder with a solvent such that the spacer structure deteriorates leaving behind unbounded ion exchange resin particles, and wherein the dissolvable binder is a liquid with viscosity of at least 0.1 Pa sec at 20° C.

2. The method of claim 1 wherein the ion exchange spacer is positioned between an anion exchange membrane and a cation exchange membrane to define a diluting chamber during the assembling of the membrane cell assembly.

3. The method of claim 1 wherein the dissolvable binder comprises a gel or foam.

4. The method of claim 1 wherein the ion exchange spacer is in the form of a sheet.

5. The method of claim 1 wherein the dissolvable binder of the ion exchange spacer is removed from the assembled electrodeionization device by flowing an aqueous solution or water through the chambers of the electrodeionization device.

* * * * *